(12) United States Patent
Shigemasa et al.

(10) Patent No.: US 9,038,165 B2
(45) Date of Patent: May 19, 2015

(54) INFORMATION PROCESSING APPARATUS, INFORMATION PROCESSING SYSTEM, AND COMPUTER PROGRAM PRODUCT

(71) Applicants: Tsuyoshi Shigemasa, Tokyo (JP); Kiyoshi Kasatani, Kanagawa (JP)

(72) Inventors: Tsuyoshi Shigemasa, Tokyo (JP); Kiyoshi Kasatani, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 65 days.

(21) Appl. No.: 13/890,361

(22) Filed: May 9, 2013

(65) Prior Publication Data

US 2013/0312085 A1 Nov. 21, 2013

(30) Foreign Application Priority Data

May 18, 2012 (JP) ................................ 2012-114087

(51) Int. Cl.
*G06F 21/00* (2013.01)
*G06F 21/83* (2013.01)

(52) U.S. Cl.
CPC ............... *G06F 21/00* (2013.01); *G06F 21/83* (2013.01)

(58) Field of Classification Search
CPC ...................................................... G06F 21/83
USPC ............................................................ 726/17
See application file for complete search history.

(56) References Cited

U.S. PATENT DOCUMENTS

| 5,355,414 | A | * | 10/1994 | Hale et al. ........................ 726/34 |
| 6,611,914 | B1 | * | 8/2003 | Lee et al. ........................... 726/9 |
| 2003/0004897 | A1 | * | 1/2003 | Smith, IV ........................ 705/76 |
| 2004/0093582 | A1 | * | 5/2004 | Segura ........................... 717/102 |
| 2006/0179322 | A1 | * | 8/2006 | Bennett et al. ................. 713/182 |
| 2008/0183820 | A1 | | 7/2008 | Golovchinsky et al. |
| 2008/0184115 | A1 | | 7/2008 | Back et al. |
| 2008/0209544 | A1 | * | 8/2008 | Kempka .......................... 726/17 |
| 2009/0018731 | A1 | * | 1/2009 | Grenell et al. .................. 701/51 |
| 2011/0047473 | A1 | * | 2/2011 | Hanna et al. ................... 715/740 |
| 2011/0145916 | A1 | * | 6/2011 | McKenzie et al. .............. 726/19 |
| 2011/0307800 | A1 | | 12/2011 | Back et al. |
| 2012/0030752 | A1 | * | 2/2012 | Bruno et al. .................... 726/16 |

FOREIGN PATENT DOCUMENTS

JP 2008-187716 8/2008

* cited by examiner

*Primary Examiner* — Yin-Chen Shaw
*Assistant Examiner* — John B King
(74) *Attorney, Agent, or Firm* — Oblon, McClelland, Maier & Neustadt, L.L.P.

(57) ABSTRACT

According to an embodiment, there is provided is an information processing apparatus including: a storage unit that stores therein information, which is set for a screen to be displayed on an information display unit, as to whether or not to permit an external input device to enter data to the information processing apparatus, and information as to whether or not to permit data entered from an external input device; an external-input-unit control unit that controls data entry to the screen from an external input device by utilizing information about a type of the external input unit and the information as to whether or not to permit the external input unit to enter data; and an input-key control unit that controls the data entry permitted by the external-input-unit control unit by consulting the information as to whether or not to permit data entered from the external input unit.

5 Claims, 9 Drawing Sheets

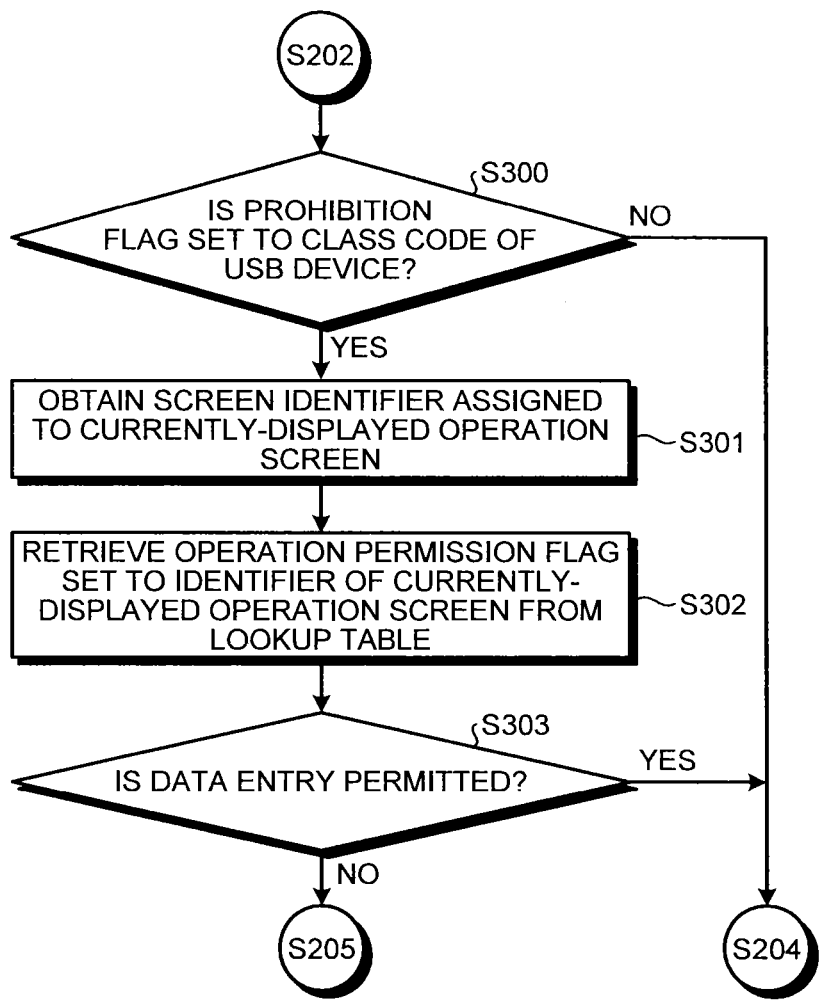

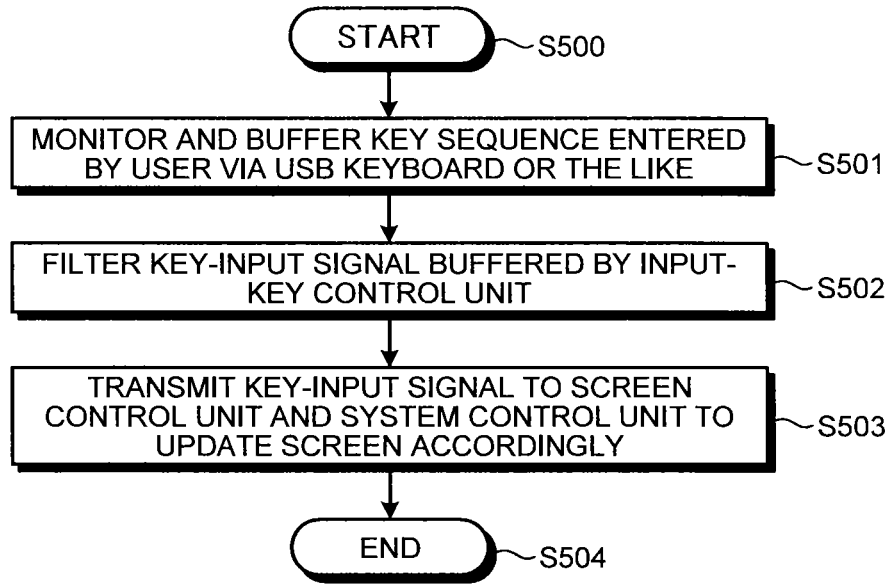

FIG.6

| KEY SEQUENCE IDENTIFIER | PROHIBITED KEY SEQUENCE |
|---|---|
| seq 1 | Alt+F4 |
| seq 2 | Ctrl+Esc |
| seq 3 | Ctrl+Alt+Del |
| seq 4 | Menu |
| seq 5 | Ctrl+Tab; Shift+Ctrl+Tab |
| ⋮ | ⋮ |

FIG.7

```
MENU          SELECT ITEM TO BE CONFIGURED USING
              ▲▼ KEYS AND PRESS Enter KEY
```

LIST OF REGISTRATION REQUESTS  701
LIST OF RECEIVED REGISTRATION REQUESTS IS DISPLAYED. YOU CAN AUTHORIZE REQUESTER.

CONFIGURE WIRED NETWORK  702
YOU MUST CONFIGURE SETTINGS HERE BEFORE YOU CAN UTILIZE WIRED NETWORK

NETWORK CONNECTION TEST  703
YOU CAN TEST NETWORK CONNECTION

CONFIGURE LANGUAGE AND TIME ZONE  704
YOU CAN CONFIGURE LANGUAGE, TIME/DATE FORM, AND TIME ZONE

PRESS MENU KEY TO RETURN TO LIST OF SITES

| CONFIGURE WIRED NETWORK | SELECT ITEM TO BE CONFIGURED USING ▲▼ KEYS AND PRESS Enter KEY |

MAC ADDRESS: 00:00:00:00:00:00     ESSENTIAL ITEMS ARE MARKED
IP ADDRESS      MANUAL     ▼ *      WITH ASTERISK *
  OBTAINING METHOD:   IP ADDRESS:  *    YOU CAN CONNECT
  IP ADDRESS:        ☐☐☐☐       *    KEYBOARD TO
  SUBNET MASK:                   *    ENTER DATA VIA
  DEFAULT GATEWAY:   WHEN YOU COMPLETE   KEYBOARD
DNS SERVER            ENTERING ADDESS,
                      PRESS Enter KEY   901
  OBTAINING METHOD:
  PREFERRED DNS SERVER:  ☐    *
  ALTERNATE DNS SERVER:  ☐

PROXY CONFIGURATION
  PROXY SERVER:     NO PROXY   ▼ *   CANCEL
  ADDRESS/IP ADDRESS:  ☐              OK  ~902
  PORT NUMBER:         ☐

INFORMATION PROCESSING APPARATUS, INFORMATION PROCESSING SYSTEM, AND COMPUTER PROGRAM PRODUCT

CROSS-REFERENCE TO RELATED APPLICATIONS

The present application claims priority to and incorporates by reference the entire contents of Japanese Patent Application No. 2012-114087 filed in Japan on May 18, 2012.

BACKGROUND OF THE INVENTION

1. Field of the Invention

The present invention generally relates to an information processing system including an embedded system and, more particularly, to an information processing apparatus, an information processing system, and a computer program product for increasing efficiency in configuring various settings for making access from an embedded device to the information processing system while ensuring security.

2. Description of the Related Art

There are embedded systems known as equipment that provides a specific function, such as a printer, a copier, a measurement device, and a video conference system, embedded with a device that provides a function of various types. Such an embedded system is required to provide a specific function, and various inputs and outputs to and from the embedded system are made via a specialized interface in many cases. For example, various data entries to and various setting configuration of conventional embedded systems are typically performed via an input unit, e.g., an operation panel, a dedicated hardware key, and/or a dedicated button, provided in the embedded system to avoid security risk. The conventional embedded systems are configured not to detect a storage device or an input device externally connected to the system via an interface, such as an USB interface.

For this reason, a user of a conventional embedded system has entered and configured operation settings, condition settings, and the like utilizing an operation panel that is provided in the embedded system and specifically structured for a specific device. More specifically, to configure network settings of the embedded system, a user must use user interfaces (UIs) specialized for the system. Here, a problem arises that because the UI is not configured for entering other operation settings than the network settings, the UI can undesirably restrict convenience for a user that desires to enter other settings after the network settings.

An embedded system that allows connecting an external input device to the embedded system is known. However, because individual management of UIs or the like is not performed, the embedded system undesirably allows a user of the external input device to operate every part of the system. More specifically, there is a problem in terms of security that a user can perform operation such as modification, deletion, access, and the like even on a part of the system that should not be configured by the user.

There has been proposed a technique for configuring various settings of a video conference system, which is one form of embedded systems, while enhancing user's convenience. For example, Japanese Patent Application Laid-open 2008-187716 discloses a technique for enhancing user's convenience in configuring various settings of a video conference system to support a specific task, such as holding a teleconference, yet minimizing security risk. This is achieved by providing UIs that restrict data entry to minimum screens and minimum entry fields by coordinating operations of hardware devices and software application.

Although it is possible to decrease security risk through the UIs of the technique disclosed in Japanese Patent Application Laid-open 2008-187716, the technique is not premised that an access to the embedded system is made via an external input device. Accordingly, there still exists a problem pertaining to a conventional specialized input device that a user must perform operation under a restricted input environment.

In view of the problem of the conventional technique, there is a need to provide an information processing apparatus, an information processing system, and a computer program product that enhances usability by permitting an information processing system implemented as an embedded system to be controlled by an external input device, and, furthermore, minimizes security risk caused by the external input device by managing access from the external input device to the information processing system.

SUMMARY OF THE INVENTION

It is an object of the present invention to at least partially solve the problems in the conventional technology.

According to the present invention, there is provided: an information processing apparatus comprising: a storage unit configured to store therein information as to whether or not to permit an external input device to enter data to the information processing apparatus, the information being set for a screen to be displayed on an information display unit, and information as to whether or not to permit data entered from an external input device; an external-input-unit control unit configured to control data entry to the screen from an external input device by utilizing information about a type of the external input unit and the information that is set for the screen as to whether or not to permit the external input unit to enter data; and an input-key control unit that controls the data entry permitted by the external-input-unit control unit by consulting the information as to whether or not to permit data entered from the external input unit.

The invention also provides an information processing system comprising: an information processing apparatus configured to include an information display unit, receive data entered via the information display unit, and transfer the data over a network; and a server unit configured to allow a plurality of information processing apparatuses connected to one another via a network to carry out mutual communications by receiving data from one of the information processing apparatuses and transferring the data to at least another one of the information apparatuses.

In the information processing system mentioned above, the information processing apparatus includes a storage unit configured to store therein information as to whether or not to permit an external input device to enter data to the information processing apparatus, the information being set for a screen to be displayed on the information display unit, and information as to whether or not to permit data entered from an external input device, an external-input-unit control unit configured to control data entry to the screen from an external input device by utilizing information about a type of the external input unit and the information that is set for the screen as to whether or not to permit the external input unit to enter data, and an input-key control unit configured to control the data entry permitted by the external-input-unit control unit by consulting the information as to whether or not to permit data entered from the external input unit.

The invention also provides a computer program product comprising a non-transitory computer-readable medium that contains a computer program that, when executed by an information processing apparatus, cause the information processing apparatus to perform a method comprising: storing information as to whether or not to permit an external input device to enter data to the information processing apparatus, the information being set for a screen to be displayed on an information display unit, and information as to whether or not to permit data entered from an external input device; controlling data entry to the screen from an external input device by utilizing information about a type of the external input unit and the information that is set for the screen as to whether or not to permit the external input unit to enter data; and controlling the data entry that is permitted by consulting the information as to whether or not to permit data entered from the external input unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a detail flowchart for determination to be made at Step S203 of FIG. 2;

FIG. 4 is a diagram illustrating an operation permission table, which is a simplest form of operation permission tables that can be utilized in the embodiment;

FIG. 5 is a flowchart for a process for filtering key sequences entered to an operation-permitted operation screen to prevent the system from unexpectedly going down or out of service according to the embodiment;

FIG. 6 is a diagram illustrating an implementation example of an input-key control table according to the embodiment;

FIG. 7 is a diagram illustrating an implementation example of an on-screen display to be displayed on an LCD panel of an information processing apparatus according to the embodiment;

FIG. 9 illustrates a display screen for entering an IP address and to be displayed when a participant focuses and clicks an entry field "IP address" on the display screen illustrated in FIG. 8;

DETAILED DESCRIPTION OF THE PREFERRED EMBODIMENTS

Figure 1:
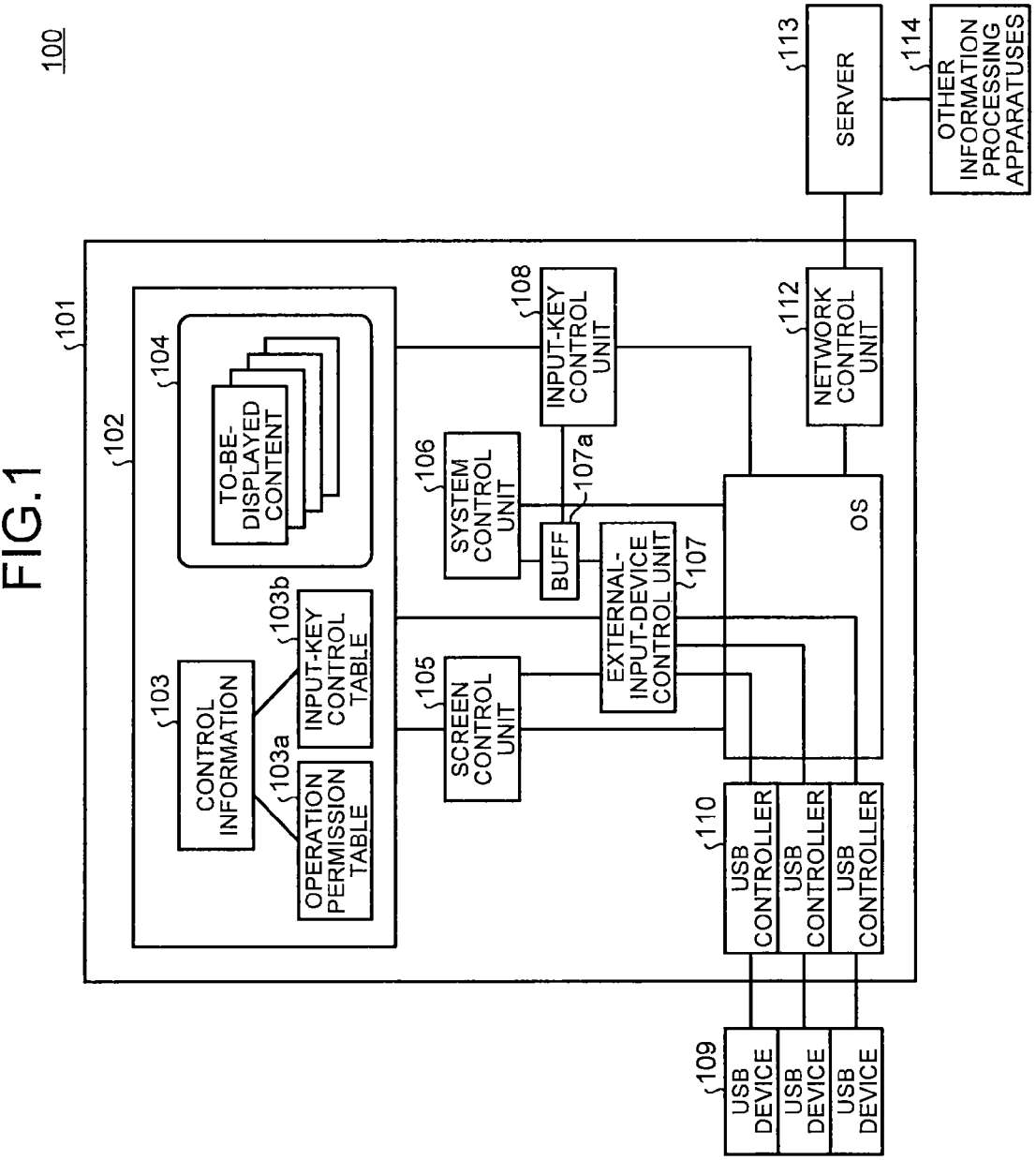
FIG. 1 is a diagram illustrating an implementation example of an information processing system according to an embodiment.

Exemplary embodiments of the present invention are described below. Note that they are for illustration only and should not be taken as limitation upon the invention. FIG. 1 is a diagram illustrating an implementation example of an information processing system 100 according to an embodiment.

The information processing system 100 includes an information processing apparatus 101 installed at a site of a participant of a video conference and a server 113 that processes various data transmitted from the information processing apparatus 101 and transfers the data to information processing apparatuses 114 installed at sites of other participants.

The information processing apparatus 101 enables mutual communications among the plurality of remote participants by converting words and actions of a participant present in front of the information processing apparatus 101 into image data and voice data, or audio-visual data (AV data) and transmitting the data to the server 113. The information processing apparatus 101 is described in more detail below. The information processing apparatus 101 includes a storage device 102 that stores therein various control information, a screen control unit 105, and a system control unit 106. The storage device 102 can be a non-volatile storage unit such as a ROM, an EPROM, an EEPROM, a flash memory, or an NVRAM. In the implementation example illustrated in FIG. 1, the storage device 102 stores therein control information 103 for use in controlling data entry from an externally-connected device according to the embodiment and a plurality of to-be-displayed contents 104. The to-be-displayed contents 104 are displayed on a display screen, such as a liquid crystal display (LCD) panel, of the information processing apparatus 101 to make various settings and data entries possible.

The control information 103 includes an operation permission table 103a and an input-key control table 103b. The operation permission table 103a contains information for designating fields, on a currently-displayed screen, to which entering data by an external input device is permitted. The input-key control table 103b contains information related to the input-permitted fields for preventing information processing based on an incorrectly-input of a key or a key sequence that invokes an influential event, such as operation of the information processing apparatus 101 or the system or continuation/discontinuation of application software.

The screen control unit 105 has a function of controlling the display screen for a process to be executed by the information processing apparatus 101. The screen control unit 105 selects one of the to-be-displayed contents 104 for execution of a process associated with a command fed from an external input device, and causes the content 104 to be displayed on the display screen of the information processing apparatus 101 or a monitor connected to the information processing apparatus 101. The system control unit 106 provides a function of controlling operations of the entire information processing apparatus 101. Specifically, the system control unit 106 coordinates various interruptions and command processing between the information processing apparatus 101 and an operating system (OS).

The information processing apparatus 101 further includes an external-input-device control unit 107 and an input-key control unit 108. The external-input-device control unit 107 determines a type of an external input device connected to the information processing apparatus 101, determines permission of inputting from the external input device capable of issuing a command to the information processing apparatus 101, and restricts fields, to which data related to a content of a currently-displayed screen can be entered. Furthermore, the input-key control unit 108 filters the signals fed from the external input device permitted by the external-input-device control unit 107, thereby preventing occurrence of an inconvenient situation. The inconvenient situation is, for example, that the OS and/or various settings are reset or re-started in response to a specific key sequence entered by a user via the external input device.

The information processing apparatus 101 further includes interface controllers, such as USB controllers 110, based on a standard(s), e.g., USB 1.0, USB 2.0, and/or USB 3.0. Each of the USB controllers 110 receives an input signal fed from a USB device 109 connected to the USB controller 110 and transmits the input signal to the external-input-device control unit 107 via an OS 111. The external-input-device control unit 107 determines whether or not to permit the USB device to enter data to the information processing apparatus 101. The input-key control unit 108 prevents the system from going down or out of service in response to entry of a specific key sequence. In the embodiments described below, it is assumed that an externally-connected device is connected to the system via a USB interface. According to the embodiment, an input device connected using another protocol, e.g., IEEE 1394, IDE, or SATA, can also be controlled in a similar manner.

The external input device to be connected in the embodiments can be, for example, but is not limited to, an input device such as a USB keyboard, a mouse, or a joystick, a USB-connectable memory, a storage medium such as an HDD, a speaker, a microphone, a web camera, an image scanner, or a printer.

The information processing apparatus 101 further includes a network control unit 112 for carrying out communications using, for example, a network interface card (NIC) based on a standard such as IEEE 802.11. In the discussed implementation example, the network control unit 112 combines image data and voice data acquired by the information processing apparatus 101 to generate AV data in a format such as MP3, Wav, MPEG-4, or H.264, and transmits the generated AV data to the server 113 using a packet communication infrastructure based on, e.g., Ethernet (registered trademark) or Wi-Fi. The network control unit 112 makes it possible to mutually transfer AV data between the information processing apparatus 101 and the other information processing apparatuses 114 installed at the plurality of sites in this way.

In another implementation example, the information processing apparatus 101 may be configured so as to transfer image data and voice data to the server 113 to cause the image data and the voice data to be encoded into AV data by the server 113, rather than encoding the image data and the voice data on-site.

Figure 2:
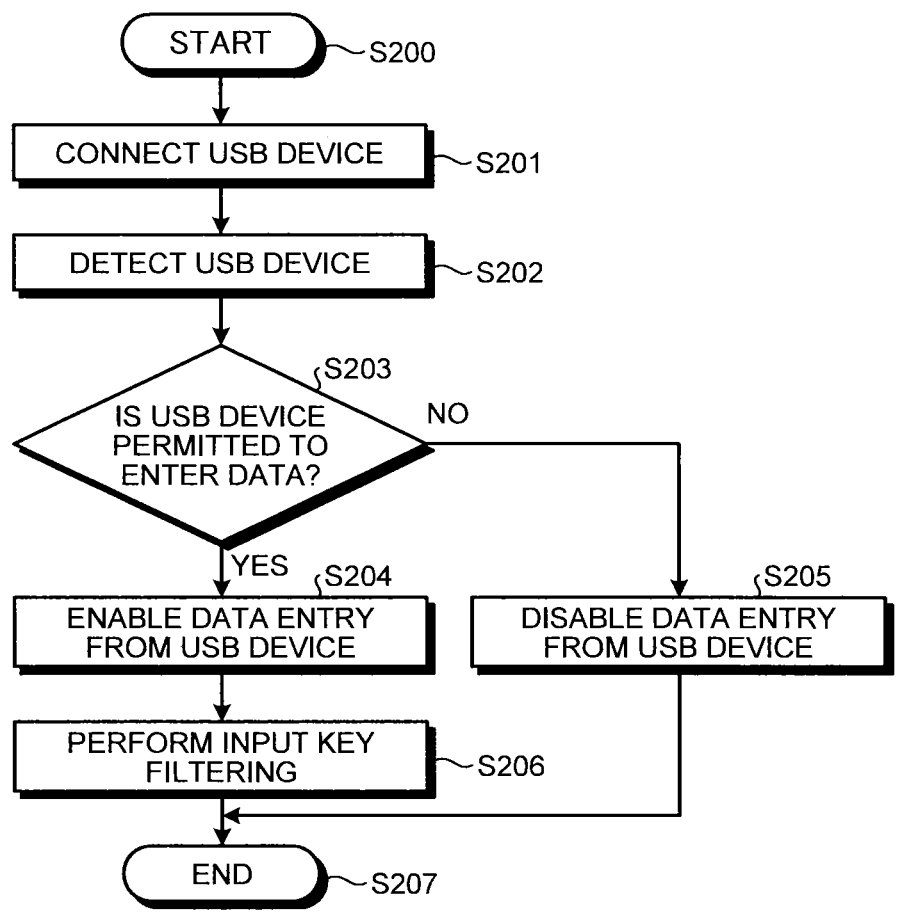
FIG. 2 is a schematic flowchart for a security management method according to the embodiment.

FIG. 2 is a schematic flowchart for a security management method according to the embodiment. The process illustrated in FIG. 2 starts from Step S200. At Step S201, a user connects a USB device, which is a subject of this management, to the information processing apparatus 101. At Step S201, the information processing apparatus 101 detects that the USB device is connected thereto. Thereafter, the information processing apparatus 101 determines whether or not to permit the detected USB device to enter data to the information processing apparatus 101 in accordance with the embodiment. In the embodiment, whether or not the USB device is permitted to enter data is not determined on the per-USB-device basis but determined by the information processing apparatus 101 in connection with an entry field on a screen that is displayed at the point in time.

When the detected USB device is permitted to enter data to the currently-displayed screen (yes at Step S203), the process is branched to Step S204 where data entry from the USB device is enabled. Thereafter, the information processing apparatus 101 controls data entered from the USB device, or, more specifically, filters input key sequences or the like, to prevent occurrence of unintended system down or the like. At Step S207, the process for a case where data entry from the USB device is permitted ends.

On the other hand, when it is determined that data entry from the detected USB device to the currently-displayed screen is not permitted (no at Step S203), the process is branched to Step S205 where data entry from the USB device is disabled by deleting an input signal fed from the USB device from a buffer memory 107a or the like without transmitting the signal to the system control unit 106. The process then ends at Step S207. Whether or not to disable data entry from the USB device is determined by obtaining a class identifier (class code) indicating a device class of the USB device, and determining whether or not the class code is permitted in the control information 103.

The process for disabling unpermitted data entry from the USB device described above can be performed by, for instance, erasing the entered data that is temporarily stored in the buffer memory 107a or the like.

The class codes that can be used for the determination are defined at www.usb.org. Examples of the class code include: 01h for audio devices; 03h for human interface devices such as a keyboard, a mouse, and a joystick; 08h for mass storage devices. The class code can be appropriately selected from the defined device classes and stored in the control information 103 in a form of the operation permission table 103a. The operation permission table 103a can be structured as a lookup table of a desired form. Each class code can be stored in the operation permission table 103a as being associated with a permission flag or a prohibition flag (an operation permission flag "No") and changed as appropriate according to user's authority level, factory default settings, or the like.

FIG. 3 is a detail flowchart for determination to be made at Step S203 of FIG. 2. As illustrated in FIG. 3, the permission determination of an inputting data from a USB device according to the embodiment starts when control is passed from Step S202. At Step S300, the class code of the detected USB device is obtained, and whether or not the prohibition flag is set to the class code is determined by searching the control information 103 for the class code. More specifically, a possible scenario is that when the information processing apparatus 101 does not include an input unit by default, a user makes it possible to enter various inputs by connecting an external input device to the information processing apparatus 101.

Accordingly, in the embodiment, when a class code of the detected USB device is, for instance, 03h, an affirmative response is returned as a result of the determination at Step S300 (yes at Step S300) to associate data entry from the USB device with an operation screen and disable the data entry on a per-entry-field basis. A screen identifier of the currently-displayed operation screen is obtained at Step S301. Thereafter, an operation permission flag set to an entry field designated by the screen identifier of the currently-displayed screen is retrieved from the operation permission table 103a at Step S302.

Whether or not data entry from the currently-focused operation screen or the entry field provided on the operation screen is permitted is determined based on a result of the retrieval at Step S302. When it is determined that data entry is permitted (yes at Step S303), the process is branched to Step S204 where an input command is permitted. On the other hand, when data entry from the currently-focused operation screen or the entry field provided on the operation screen is determined as not being permitted (no at Step S303), the process is branched to Step S205 where data entry from the external input device (the USB device) is disabled.

Employing the process described above makes it possible to enhance security and robustness of the system while allowing a user to use an external input device connected to the system to increase usability under minimum restriction.

FIG. 4 is a diagram illustrating an operation permission table 400, which is a simplest form that can be utilized in the embodiment. The implementation illustrated in FIG. 4 is an example in which operation permissions are set on a per-operation-screen basis and can be implemented as a lookup table stored as the control information 103 in the storage device 102. The operation permission table 400 illustrated in FIG. 4 contains operation screen identifiers for specifying operation screens in a column 410. The operation screen identifiers are identification numbers in the discussed implementation example. In the implementation example illustrated in FIG. 4, operation permission flags indicating that operation is permitted are assigned on the per-operation-screen basis. The operation permission flags are set in a column 420 as text strings in the discussed implementation example. The operation permission flag is used as follows: every operation entered to a screen, to which operation permission flag "NO" is assigned, from an external input device should be disabled. On the other hand, every operation entered to a screen, to which an operation permission flag "YES" is assigned, from an external input device is to be permitted.

In another embodiment, data entries can be controlled on a per-entry-field basis by: forming sub records that allow assigning operation permission flags to entry fields arranged on the operation screen on a entry-field-by-entry-field basis; and assigning the sub records on the per-entry-field basis. When operation permission is to be controlled on the per-entry-field basis, access permissions on the per-entry-field basis can be set by consulting values in the column 420 of FIG. 4.

FIG. 5 is a flowchart of an implementation example of a process to be performed at Step S206 of FIG. 2 for filtering key sequences entered to an operation-permitted operation screen to prevent the system from unexpectedly going down or out of service according to the embodiment. The process illustrated in FIG. 5 starts from Step S500. At Step S501, a key sequence entered by a user via a USB keyboard is monitored. At Step S502, the input-key control unit 108 arranged downstream relative to the external-input-device control unit 107 temporarily buffers the key-input signal entered via the permitted USB keyboard.

At Step S502, the input-key control unit 108 performs filtering on the buffered key sequence depending on whether the key sequence is permitted by the information processing apparatus 101 by looking up the input-key control table stored as the control information 103. Subsequently, at Step S503, the key-input signal is transmitted to the screen control unit 105 and the system control unit 106 according to a result of the filtering performed at Step S502 so that the screen is updated accordingly. The process ends at Step S504. Meanwhile, disablement of the unpermitted input key signal can be executed by deleting or erasing the unpermitted key sequence from key sequences stored in the buffer memory.

FIG. 6 is a diagram illustrating an implementation example of an input-key control table 600 according to the embodiment. The input-key control table 600 contains key sequence identifiers in a column 610. The input-key control table 600 contains prohibited key sequences in a column 620. The input-key control unit 108 buffers at least two keys of incoming key sequences and compares the at least two keys of the sequence against the input-key control table 600, thereby determining whether or not the key sequence being checked is stored in the input-key control table 600.

When it is determined as a result of this determination that the input-key control table 600 contains the currently-checked key sequence, the key sequence being checked is deleted from the buffer memory 107a, and thereafter the key sequence is transmitted to the system control unit 106 to be utilizing in control of the information processing apparatus 101.

The process described above deletes an inappropriate key sequence, from control signals, that is unexpectedly entered from an external input device, thereby minimizing a possibility that the information processing system 100 according to the embodiment unexpectedly goes down or out of service (i.e., settings and/or application software is deleted).

FIG. 7 is a diagram illustrating an implementation example of an on-screen display 700 to be displayed on the LCD panel of the information processing apparatus 101 according to the embodiment. It is necessary for the information processing apparatus 101 to issue a request to the server 113 to carry out communications with remote participants connected over a network. Various menus are provided and displayed for this purpose. In the illustrated example, the on-screen display 700 includes a "LIST OF REGISTRATION REQUESTS" menu 701, a "CONFIGURE WIRED NETWORK" menu 702, a "NETWORK CONNECTION TEST" menu 703, a "CONFIGURE LANGUAGE AND TIME ZONE" menu 704, and the like. Other menus can be displayed by operating a scroll bar 705.

A participant configures settings for network connection and the like before using the information processing apparatus 101. After a network connection test, the participant configures language and the like and transmits a registered request to the server 113 to become ready for taking part in communications such as a conference. An input environment for this configuration can be improved by using an input device (human interface device), such as a USB keyboard, a mouse, and/or a joystick, that facilitates input actions. However, when inputs via such an input device are allowed with no limit, a problem can arise that access to security information stored in the server 113 is undesirably permitted or the system goes down or out of service. For this reason, it is necessary for each of the information processing apparatuses 101 to restrict data that can be entered using keys. Accordingly, it is possible to impose a similar restriction to that imposed on the operations of the information processing apparatus 101 on a human interface device that provides excellent operability.

Figure 8:
FIG. 8 is a diagram illustrating an implementation example of an advanced configuration screen to be displayed when a participant selects a "CONFIGURE WIRED NETWORK" menu illustrated in FIG. 7 and causes the menu to be displayed.

FIG. 8 is a diagram illustrating an implementation example of an advanced configuration screen 800 to be displayed when a participant selects the "CONFIGURE WIRED NETWORK" menu 702 illustrated in FIG. 7 and causes the menu 702 to be displayed. As illustrated in FIG. 8, the advanced configuration screen 800 contains entry fields 801 to 804 for configuring an IP address necessary for network connection, entry fields 805 to 807 for configuring a DNS server, and an entry field 808 for configuring a proxy server. Each entry field, to which data can be entered via a keyboard, is indicated with an asterisk in FIG. 8. Such indication with an asterisk or the like can be implemented utilizing the operation permission table 400 described above.

Entry fields that are not marked by an asterisk are displayed for the sake of display only; data entry from an external input device to the entry fields with no asterisk is prevented according to the embodiment. A participant that desires to configure various settings of the information processing apparatus 101 according to the embodiment can connect a USB keyboard, for example, to the information processing apparatus 101, access the permitted entry fields, and configure various values via the USB keyboard. The implementation example illustrated in FIG. 8 allows connection of an external input device, e.g., a USB mouse, and/or an auxiliary input device, e.g., a joystick. Accordingly, after configuring various settings, a participant can cancel or set the settings by clicking a cancel button 809, an OK button 810, or the like. Note that it is possible to activate the cancel button 809 and the OK button 810 by key entry using the USB keyboard; a key sequence to be entered for this activation is not subjected to the filtering performed by the input-key control unit 108 irrespective whether the key-input sequence is entered via a mouse or transparent key-input signals.

FIG. 9 illustrates a display screen 900 for entering an IP address. The display screen 900 appears when a participant focuses and clicks the entry field "IP address" 802 on the display screen illustrated in FIG. 8. A participant configures an IP address by entering an IP address to an entry field in accordance with a comment displayed in a message box 901 via a USB keyboard. After entering the IP address, the participant can complete the IP address configuration by pressing the "Enter" key or mouse-clicking an OK button 902.

As illustrated in FIGS. 8 and 9, according to the embodiment, also when an extension input device is connected to the information processing apparatus 101 implemented as an embedded device for extending functions of the information processing apparatus 101, it is possible to increase usability of the embedded device while restricting external data entries to within a permitted range that does not interfere with specific functions provided by the embedded device. It becomes also possible to control the externally-configurable range using firmware, an external storage device, network communication, or the like according to a type and/or an object of the embedded device easily.

Figure 10:
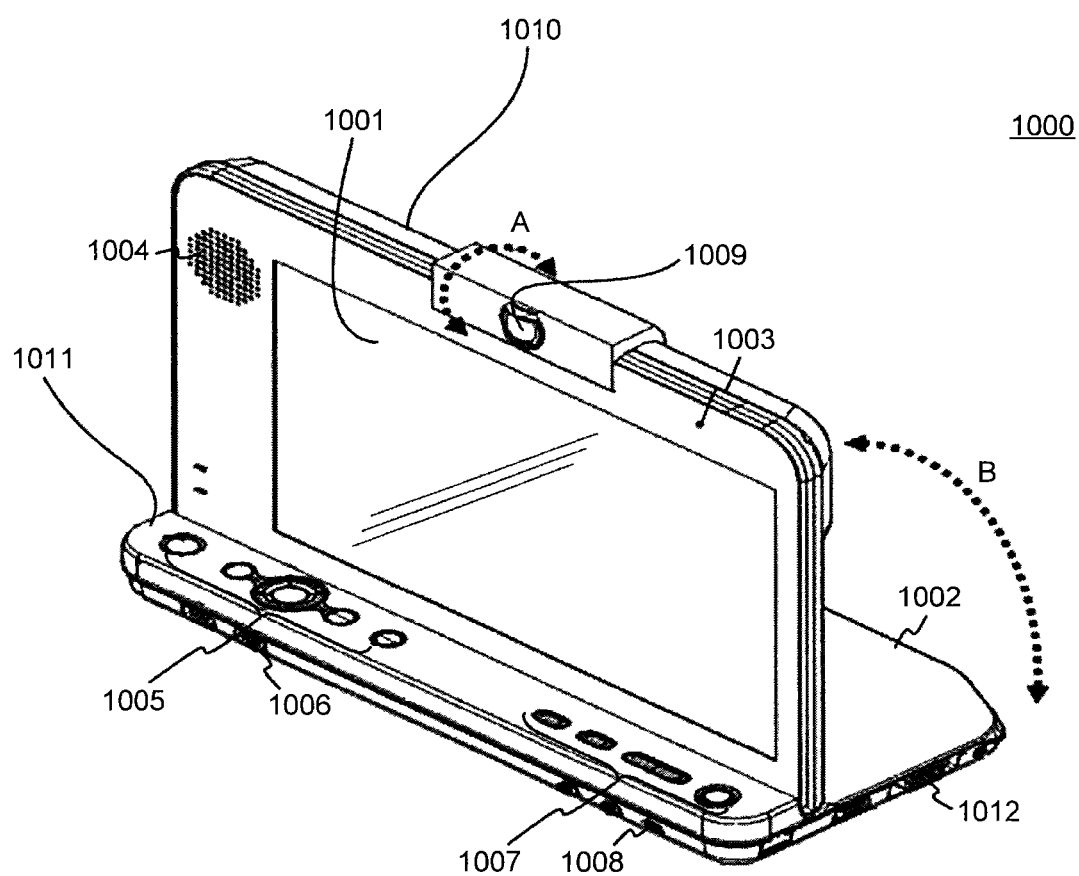
FIG. 10 is a diagram illustrating a video conference terminal, which is a specific embodiment form of the information processing apparatus according to the embodiment.

FIG. 10 illustrates a video conference terminal 1000, which is a specific embodiment form of the information processing apparatus 101 according to the embodiment. The video conference terminal 1000 allows a participant to establish communications with another participant at a remote site by transmitting AV data to the server 113 (which is not illustrated in FIG. 10) at a remote site via an appropriate network infrastructure based on, e.g., Ethernet or Wi-Fi.

The configuration of the video conference terminal 1000 is described in more detail below. The video conference terminal 1000 includes a horizontal frame unit 1002, in which various functional units illustrated in FIG. 1 are housed, and an LCD panel unit 1010 that has a function of displaying various information to the participant. The horizontal frame unit 1002 and the LCD panel unit 1010 are hinged to an edge portion of an interface unit 1011 that is formed to be slightly thicker than the horizontal frame unit 1002. The LCD panel unit 1010 is configured to pivot about the hinge toward the horizontal frame unit 1002 and, when the LCD panel unit 1010 is pivoted along an arrow B into contact with the horizontal frame unit 1002, the LCD panel unit 1010 is unified with the horizontal frame unit 1002 to be flush with the LCD panel unit 1010.

The LCD panel unit 1010 includes a digital camera 1009, an LCD panel 1001, and a microphone 1003. The digital camera 1009 can capture an image desired by a participant by rolling in directions indicated by an arrow A. The LCD panel 1001 displays an image captured by the digital camera 1009, generates AV data of an appropriate compression format such as MP3, MPEG4, or H.264 by capturing movie data of the participant and synchronizing the movie data with voice data recorded by the microphone 1003, and transfers the AV data to the server 113 over the network.

There can be employed another embodiment that allows the video conference terminal 1000 to carry out communications with another participant in the following manner: the movie data and the voice data are not encoded but transferred to the server 113 as raw data; the server 113 generates AV data by synchronizing the movie data with the voice data and transfers the AV data to the other participant. The LCD panel unit 1010 further includes a speaker 1004 so that voice decoded from AV data transferred from another participant can be reproduced and output.

According to the other embodiment described above, load such as encoding placed on the video conference terminal 1000 can be reduced; and processing load, such as the video conference terminal 1000, can be off-loaded from the information processing apparatus 101 and placed on the server. As a result, the information processing apparatus 101 can be improved in terms of cost, weight, and portability.

Input interface functions that are generally necessary for an embedded device, e.g., the video conference terminal 1000, are packaged into the interface unit 1011. Examples of the interface functions include a power key for switching on and off a power source, a menu key for causing a menu to be displayed, cursor-movement keys, a return key (or the Enter key), and a communication-disconnect key that are gathered and arranged as a main-body control key group 1005. In addition, a camera-switch key, an LCD-brightness control key, a volume control key, a sound mute key, and the like are gathered and arranged as a function control key group 1007 on the interface unit 1011.

The interface unit 1011 further includes a USB host port 1006, an audio input/output port 1008, and an HDMI port 1012 to allow various inputs/outputs and control of the inputs/outputs. Although the video conference terminal 1000 is provided with minimum input/output functions as illustrated in FIG. 10, the input interface functions are not sufficient to configure network and other various settings. Accordingly, a user can improve usability of the video conference terminal 1000 by connecting a USB keyboard, a mouse, and/or the like to the USB host connector(s) to facilitate input operations. Meanwhile, the video conference terminal 1000 may further include a modular jack to allow Ethernet (trademark) connection (not shown).

The video conference terminal 1000 may further include an interface(s) such as RGB, DVI, and/or HDMI port(s) that allows connection of an external display. Connecting an external display device to the interface leads to further enhancement of usability by sharing images of other sites among a large number of people at a site of the participant.

Meanwhile, the video conference terminal 1000 processes only functions arranged in the interface unit 1011 as illustrated in FIG. 10 by default settings. Accordingly, when an external input device connected to the video conference terminal 1000 is allowed to perform functions without limitation, it is predicted that malfunction, system-down, out-of-service, or the like will occur due to improper settings. Furthermore, unwelcome access to the video conference terminal 1000 and even to the server 113 is enabled, which lowers secureness.

However, in the embodiment, it is presumed that an external input device should be connected. According to the embodiment, even under a condition where an externally-connected device is connected to an embedded device, inputs from the external input device are permitted within a limited range that does not interfere with functions provided by the embedded device while ensuring security.

Figure 11:
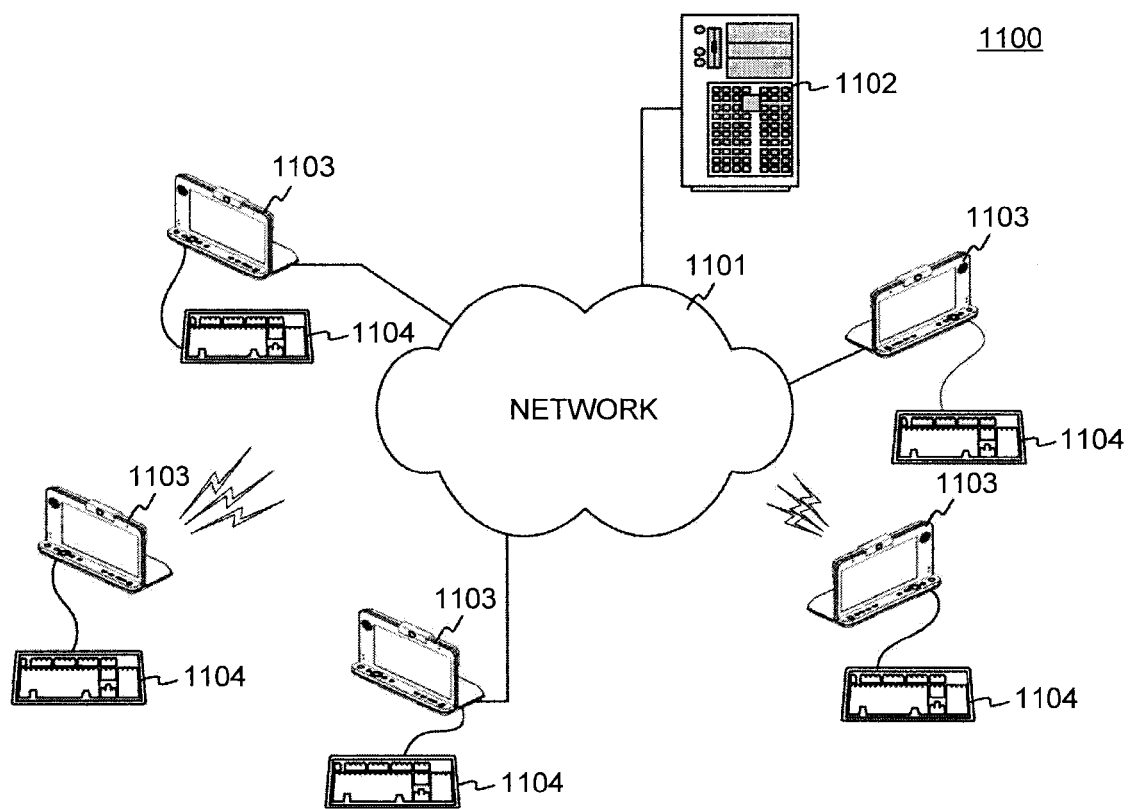
FIG. 11 is an outline view of a video conference system according to the embodiment.

FIG. 11 is an outline view of a video conference system 1100 according to the embodiment. A plurality of video conference terminals 1103 are connected via the network 1101 to the video conference system 1100 illustrated in FIG. 11. An external input device, e.g., a USB keyboard 1104, is connected to each of the video conference terminals 1103 to expand functions. Data acquired by the video conference terminal 1103 is transmitted to a server 1102 using wireless communication based on, e.g., Wi-Fi, according to a communication protocol, e.g., Ethernet (trademark) or IEEE 802.11. After being encoded into AV data as appropriate, the data is transferred to the video conference terminal 1103 of each of participants by means of streaming distribution or the like.

Upon receiving the AV data, the video conference terminal 1103 decodes the AV data, causes the decoded image to be displayed on the LCD panel 1001 or an external display of the video conference terminal 1103 and voice data to be reproduced and output by the microphone. Mutual communications among the remote participants are thus enabled.

The video conference system illustrated in FIG. 11 can increase convenience for a user even in an environment where an external input device is connected and an unexpected input can be entered to the video conference terminal. This is because the system can restrict data entries while improving usability, and allow the externally-connected input device to control the information processing system while minimizing security risk associated with connecting the external input device to the system.

According to an embodiment, UIs associated with an external input device are provided to restrict data-entry ranges to minimum screens and minimum entry fields so that access from an external input device to an information processing system is enabled. According to an embodiment, access from the external input device to the system is restricted to minimum entry fields on minimum screens that are displayed. This is achieved by controlling UIs to be displayed depending on a result of detection of connection of the external input device.

While the embodiment has been described by way of the implementation examples, application of the embodiment is not limited to video conference terminals. The embodiment can be used to improve restricted input environment of an information processing apparatus, such as a smart phone or a tablet PC, of which importance lies in portability. It should be appreciated that the scope of the present invention is not limited to the particular embodiments herein described and other embodiment forms including addition, modification, other implementation examples, that will occur to those skilled in the art are also included within the scope of the present invention.

According to an aspect of the present invention, by controlling UIs of an information processing system, to which an external input device is connectable, it becomes possible to control the information processing system from an externally-connected input device while increasing user's usability and yet minimizing security risk associated with connecting an external input device to the system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a memory that stores therein first information as to whether or not to prohibit an external input device to enter any data to one or more input fields arranged on a screen of the information processing apparatus, the first information being set for the screen to be displayed on an information display, and second information as to whether or not to permit specific data entered from the external input device, wherein the memory stores the second information as input-key control information containing prohibited key sequences;
an external-input-device controller that controls data entry to the screen from the external input device by utilizing control information about a type of the external input device and the first information that is set for the screen as to whether or not to prohibit the external input device to enter any data to the one or more input fields, wherein the type of the external input device is stored in the control information as device information which is associated with a permission indicator or prohibition indicator for data entry from the external input device, wherein the device information indicates a user's authority level information; and
an input-key controller that controls the data entry permitted by the external-input-device controller by consulting the second information, wherein when the external input device is not prohibited from entering any data, the input-key controller discards specific data entry that is prohibited, by consulting the second information,
wherein the first information that is set for the screen as to whether or not to prohibit the external input device to enter any data to the one or more input fields arranged on the screen of the information processing apparatus is configured as operation permission information for containing operation permission assigned to a plurality of input fields such that when there are a plurality of input fields simultaneously displayed on the information display there is separate information set as to whether or not to prohibit the external input device to enter any data to each respective one of the plurality of input fields.

2. The information processing apparatus according to claim 1, wherein the external input device is a human interface device.

3. An information processing system comprising:
a first information processing apparatus that includes an information display, receives data entered via the information display, and transfers the data over a network; and
a server that allows a plurality of information processing apparatuses, which includes the first information processing apparatus, connected to one another via the network to carry out mutual communications by receiving data from one of the information processing apparatuses and transfers the received data to at least another one of the information apparatuses, wherein
the first information processing apparatus includes
a memory that stores therein first information as to whether or not to prohibit an external input device to enter any data to one or more input fields arranged on a screen of the information processing apparatus, the first information being set for the screen to be displayed on an information display, and second information as to whether or not to permit specific data entered from the external input device, wherein the memory stores the second information as input-key control information containing prohibited key sequences,
an external-input-device controller that controls data entry to the screen from the external input device by utilizing control information about a type of the external input device and the first information that is set for the screen as to whether or not to prohibit the external input device to enter any data to the one or more input fields, wherein the type of the external input device is stored in the control information as device information which is associated with a permission indicator or prohibition indicator for data entry from the external input device, wherein the device information indicates a user's authority level information, and an input-key controller that controls the data entry permitted by the external-input-device controller by consulting the second information, wherein when the external input device is not prohibited from entering any data, the input-key controller discards specific data entry that is prohibited, by consulting the second information, wherein the first information that is set for the screen as to whether or not to prohibit the external input device to enter any data to the one or more input fields arranged on the screen of the information processing apparatus is configured as operation permission information for containing operation permission assigned to a plurality of input fields such that when there are a plurality of input fields simultaneously displayed on the information display there is separate information set as to whether or not to prohibit the external input device to enter any data to each respective one of the plurality of input fields.

4. The information processing system according to claim 3, wherein the information processing system is a video conference system.

5. A computer program product comprising a non-transitory computer-readable medium that contains a computer program that, when executed by an information processing apparatus, cause the information processing apparatus to perform a method comprising:

storing first information as to whether or not to prohibit an external input device to enter any data to one or more input fields arranged on a screen of the information processing apparatus, the first information being set for the screen to be displayed on an information display, and second information as to whether or not to permit specific data entered from the external input device, wherein the memory stores the second information as input-key control information containing prohibited key sequences, controlling data entry to the screen from the external input device by utilizing control information about a type of the external input device and the first information that is set for the screen as to whether or not to prohibit the external input device to enter any data to the one or more input fields, wherein the type of the external input device is stored in the control information as device information which is associated with a permission indicator or prohibition indicator for data entry from the external input device, wherein the device information indicates a user's authority level information, and controlling the data entry that is permitted by consulting the second information, wherein when the external input device is not prohibited from entering any data, discarding specific data entry that is prohibited, by consulting the second information wherein the first information that is set for the screen as to whether or not to prohibit the external input device to enter any data to the one or more input fields arranged on the screen of the information processing apparatus is configured as operation permission information for containing operation permission assigned to a plurality of input fields such that when there are a plurality of input fields simultaneously displayed on the information display there is separate information set as to whether or not to prohibit the external input device to enter any data to each respective one of the plurality of input fields.

* * * * *